United States Patent [19]

Kruger et al.

[11] Patent Number: 4,814,597
[45] Date of Patent: Mar. 21, 1989

[54] APPARATUS AND METHOD FOR ENHANCING RADIOGRAPHS AND THE LIKE

[75] Inventors: Robert A. Kruger, Salt Lake City, Utah; James A. Sorenson, Madison, Wis.

[73] Assignee: University of Utah Research Foundation, Salt Lake City, Utah

[21] Appl. No.: 126,516

[22] Filed: Nov. 30, 1987

[51] Int. Cl.$^4$ .............................................. G01J 1/32
[52] U.S. Cl. ..................... 250/205; 355/80; 356/444
[58] Field of Search ............... 250/205, 234; 355/20, 355/80, 81; 356/443, 444

[56] References Cited

U.S. PATENT DOCUMENTS

| | | | |
|---|---|---|---|
| 3,984,187 | 10/1976 | Bestenreiner et al. | 355/80 |
| 4,265,532 | 5/1981 | McIntosh | 355/20 |
| 4,521,104 | 6/1985 | Craig | 355/20 |
| 4,666,306 | 5/1987 | Matsumoto | 356/444 |

*Primary Examiner*—David C. Nelms
*Assistant Examiner*—Stephone Allen
*Attorney, Agent, or Firm*—Thorpe, North & Western

[57] ABSTRACT

Method and apparatus for producing an enhanced radiographic image from a developed radiograph. The apparatus includes a support structure for supporting the radiograph in a stacked relationship with the radiographic film, a light source positioned in close proximity to the radiograph for directing a beam of light at the radiograph to sweep generally in a line from one side to the other, and an elongate light sensor aligned with the line of travel of the light beam to sense and signal the intensity of the light passing through the radiograph and film. A controller responds to the signals produced by the light sensor by producing light control signals which are applied to the light source to vary the intensity and/or the scanning speed of the light beam. As the scanning takes place, the support structure moves transversely of the line of travel of the light beam so that the radiograph is scanned by light substantially over its length and width. As a result, an enhanced radiographic image is created by reducing the density of the high density portions of the radiograph, and increasing the density of the low density portions. Also, the light beam width or spot size may be varied to further improve the detail enhancement of the radiograph.

9 Claims, 2 Drawing Sheets

TO CONTROL UNIT 44

APPARATUS AND METHOD FOR ENHANCING RADIOGRAPHS AND THE LIKE

BACKGROUND OF THE INVENTION

This invention relates to an optical processing method and apparatus for enhancing radiographs, and the like.

Radiography is defined as the technique of producing a photographic image of an opaque specimen (typically a human body part) by transmitting a beam of electronic radiation (typically x-rays) through the specimen onto an adjacent photographic film. An image is produced on the film because the variations in thickness, density and chemical composition of the specimen serve to block or absorb some of the radiation energy, thereby causing the intensity of the radiation that does strike the photographic film (or other sensor) to be a function of the specimen through which the energy passed.

One problem in obtaining useful radiographs of humans is that for a body part being x-rayed, there typically is a need for different x-ray exposure levels over the length of that body part. Thus, one portion of the body part may only need a slight exposure to the x-ray to obtain the internal detail needed, whereas another portion may require much greater exposure to obtain the same detail. However, fixing some compromise level of exposure simply results in one portion being underexposed and another portion being overexposed. This is especially true for images having a wide range of exposure such as chest radiographs.

One approach for overcoming this problem is so-called unsharp masking which involves substracting a blurred copy of an original radiographic image from itself such that large-area exposure/density differences are selectively suppressed, while the contrast of fine details are hopefully preserved and in some cases enhanced. Two techniques which have been proposed for achieving unsharp masking include (a) blurred undersubtraction (BUS), see Kattan, K. R., "A Modified Blurred Undersubtraction Method (BUS) and Its Applications", Radiol, 1980, 134:782, and (b) Logetronography, see St. John, E. G., and Craig, D. R., "Logetronography", AJR. 1957; 78:123-133, and Street, J. N., MacIntosh, W. L., Mannack, A. W., and Gibson, R. C., "Optimizing Photographic Information Transferred By C.R.T.—A Technology and Applications Review", SPIE, 1984; 496:162-171. The BUS method involves photographic printing of the original film image or radiograph through a blurred negative of itself. A disadvantage of this is the requirement of a number of precise manipulations and positionings of film in a darkroom and is therefore quite time consuming. In Logetronography, a photographic copy is made of the original image by scanning the image with a cathode ray tube generated light beam, the intensity of which is modulated to compensate for regional density differences in the original image. The disadvantages of the Logetronography approach include inability to adjust the size and shape of the blurring function (light beam or source) used to generate the unshaped masking effect, and difficulty in eliminating light scattering and glare in the lenses and other glass components. Also, the long optical path present in currently used devices gives rise to large and cumbersome apparatus that is inconvenient in many standard-sized x-ray dark rooms. These disadvantages result in radiographs still containing blurred, unsharp images (although improved over the original radiograph).

SUMMARY OF THE INVENTION

It is an object of the present invention to provide a method and apparatus for processing already exposed radiographic film to produce a new radiograph having enhanced detail.

It is another object of the invention to provide a simple and yet effective method and apparatus for optically processing radiographs to produce the detail desired.

It is a further object of the invention to provide such a method and apparatus which allows for ready adjustment of the size of the blurring function.

It is an additional object of the invention to provide compact, easy to handle and use apparatus for carrying out such processing.

The above and other objects of the invention are realized in a specific illustrative embodiment thereof which includes a film holder for holding a developed film and undeveloped film generally parallel, one above the other and in close proximity to one another, a light source positioned on one side of the film holder for directing a beam of light towards the developed film to scan generally in a line across the film, the intensity of the light being variable in response to light control signals supplied to the light source, an array of sensors positioned on the other side of the film holder and aligned with the line of travel of the light beam, each sensor in the array being adapted to sense and signal the intensity of light impinging thereon, and a controller responsive to signals from the sensors for developing and applying to the light source light control signals for varying the intensity of the light beam. Apparatus is also included for causing relative movement between the film holder and the light source and array of sensors, either by moving the film holder or by moving the light source and sensors, so that the developed film is scanned by the light substantially over its length and width, At least some of the light directed towards the developed film passes therethrough to the unexposed film and then to the sensors which develop signals representing the intensity of the received light. The controller, in response to these signals, signals the light source to increase the intensity of the light when the intensity of the light detected by the light sensors decreases, and vice versa. In this way, detail which otherwise would not be evident on the developed film is enhanced by reducing the density of high density portions of the developed image and increasing the density of low density portions of the image. Control of the degree of detail enhancement may be had by controlling the size (width) of the light beam, with the smaller size providing greater enhancement of detail.

In an alternative embodiment of the invention, the scanning speed of the light beam may be varied as the intensity of the detected light passing through the film varies. Thus, as the intensity of the detected light decreases, the scanning speed would decrease and vice versa. This, again, would have the effect of enhancing the detail of a developed film. In still another embodiment, the intensity, scanning speed of the light beam may be varied in accordance with the light variation in the intensity of light detected by the sensors. In a further embodiment, the speed of relative movement between the film holder and the light source and array of sensors may be varied in accordance with variation in the intensity of light detected by the array of sensors.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
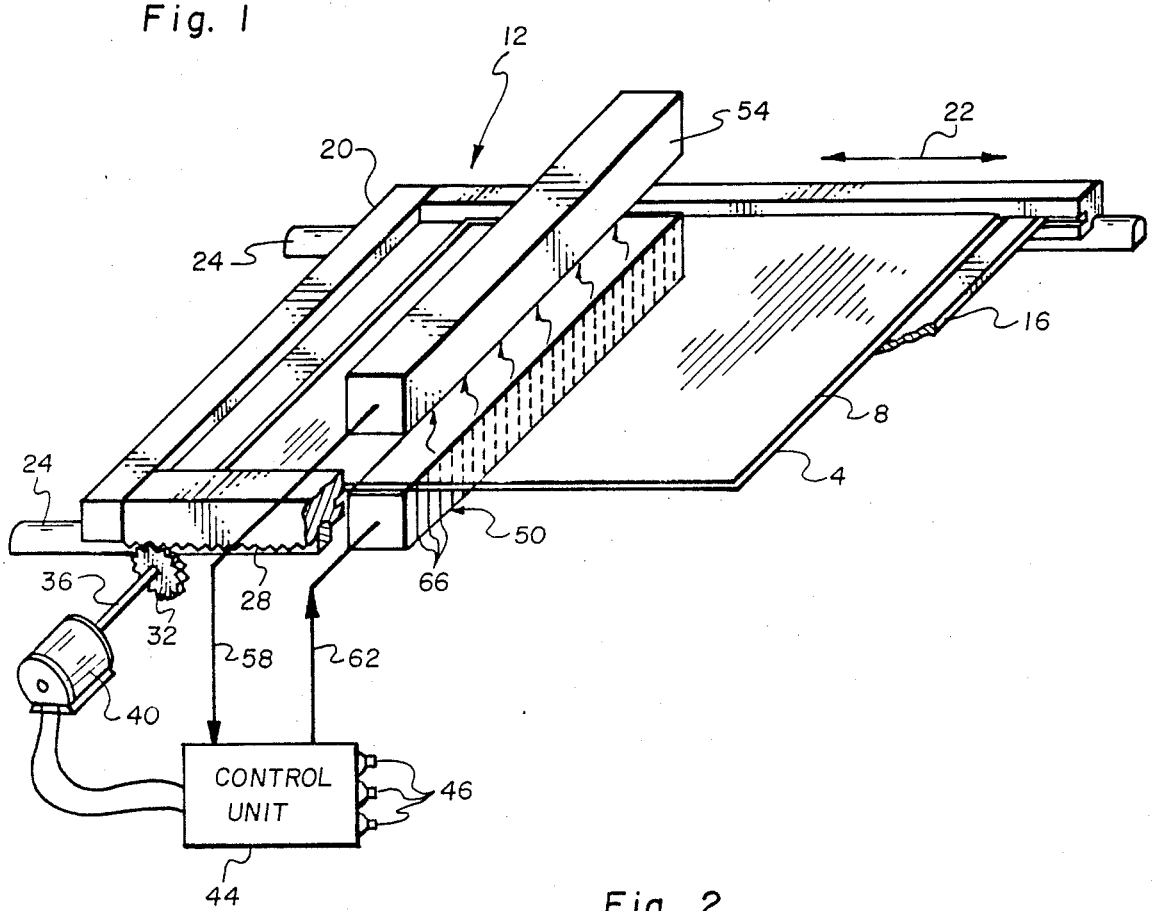
FIG. 1 is a perspective partially fragmented view of apparatus for optically processing and enhancing radiographs and the like made in accordance with the principles of the present invention.

Referring to FIG. 1, there is shown apparatus for optically processing an original film 4, such as a radiograph, to produce an enhanced image on an unexposed film 8, such as radiographic film. The two films are held in a generally parallel, stacked relationship by a support structure 12 comprised of a transparent plate 16, on which the film is placed, and a frame 20, in which the plate 16 is mounted. To achieve sharpest detail on the enhanced image, additional means may be employed for maintaining intimate contact between the original image and the unexposed film, such as a compliant roller adjacent to the light exposure path, or a translucent plate overlaying the entire image and compressed under vacuum pressure. The support structure 12 is mounted to move back and forth, as indicated by arrow 22, on guide rails 24. The lower edge of one side of the frame 20 includes a linear, toothed gear 28 which meshes with a toothed gear wheel 32, mounted on a drive shaft 36 of a reversible motor 40. The motor 40, in response to control signals from a control unit 44, drives the gear wheel 32 to rotate, first in one direction, at a controlled speed, and then in the opposite direction, to thereby cause the support structure 12 to move from a starting position (to the right in FIG. 1) through an exposure excursion (toward the left in FIG. 1), and back to the starting position.

As the support structure 12 is moved through the exposure excursion, it carries the original, developed film 4 and unexposed film 8 between an elongate light source 50, positioned between the support structure, and an elongate photo-optical sensor 54, positioned above the support structure. The light source 50 and sensor 54 are aligned, one below the other, in a direction transversely of the direction of movement of the support structure 12, with the light source being in close proximity, within about millimeters, to the original film.

The light source 50 directs a beam of light toward the original film 4, to sweep or scan from one side of the film to the other side. Light thus passes through the film 4 to expose the unexposed film 8 at a level determined by the density of the image on the film 4, the intensity of the light beam, and the scanning speed of the light beam. The light then passes to the photo-optical sensor 54 which produces signals indicating the intensity of the received light. These signals are delivered to the control unit 44 which produces and applies light control signals to the light source 50 to control the intensity of the scanning light beam and/or the scanning speed. In particular, if the intensity of detected light is low, indicating that a dark area of the image on the original film 4 has been encountered by the scanning light beam, then the control unit 44 signals the light source 50 to either increase the intensity of the light beam, or decrease the scanning speed (or a combination of the two) to thereby lighten the area for reproduction on the unexposed film 8. On the other hand, if the intensity of detected light is high, indicating that a light area of the original film image has been encountered, then the control unit 44 signals the light source 50 to decrease the intensity of the light beam, or increase the scanning speed (or both) to thereby darken the corresponding area on the unexposed film 8. While the scanning is occurring, the motor 40 is moving the support structure 12 so that ultimately the entire area of the film 4 is scanned with light. In this manner, underexposure or overexposure of the original film 4 may be compensated to suppress large-area image variation and enhance and sharpen image detail.

The control unit 44 might illustratively be a microprocessor or personal computer, such as the IBM PC, capable of producing light control signals in response to signals indicating the intensity of detected light. The photo-optical sensor 54 might illustratively be a linear array of photodiodes or photomultiplier tubes, each of which produces an output signal representing the intensity of light detected by it. These output signals are supplied over leads 58 (shown as a single line in FIG. 1) to the control unit 44. The light source 50 could illustratively be a linear array of light-emitting diodes 66, which are sequentially activated by signals applied over leads 62 from the control unit 44 to the light source 50, to produce a sweeping or scanning of light across the film 4. The magnitude of the signals applied to the light-emitting diodes could determine the intensity of the light generated by the diodes, and the frequency at which the signals are applied could determine the scanning speed or rate. Additionally, the speed of movement of the support structure 12 could be varied by the control unit 44 and the motor 40 to also control the amount of light to which the films 4 and 8 are exposed.

The control unit 44 also may be used to compensate for nonuniformities in the light exposure and sensing apparatus. Such compensation might be achieved, for example, by performing a scan of a clear film and recording signal intensity as a function of position and retaining this information as a correction file in the control unit. This information could then be used to modulate intensity or duration of the exposing light to compensate for system nonuniformities.

Utilization of an array of light-emitting diodes positioned in close proximity to the original film 4 reduces dispersion or scattering of light (which causes inaccurate reproduction of the original image) without requiring cumbersome focusing optics or long light beam paths.

Figure 2:
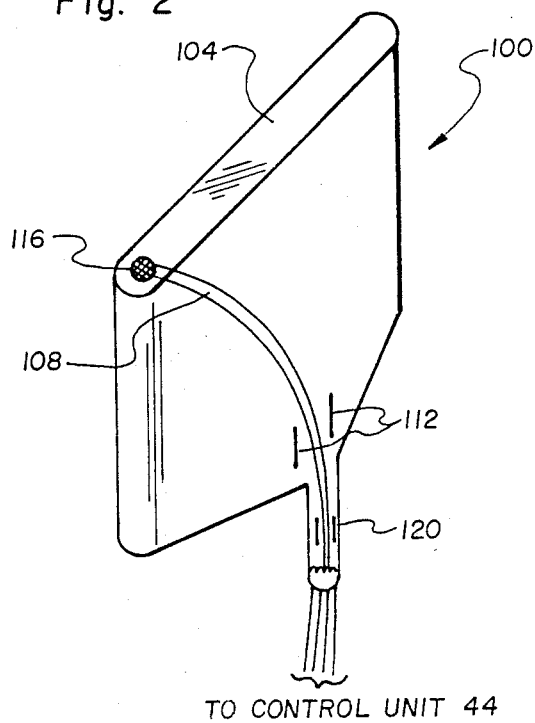
FIG. 2 is a perspective view of an alternative embodiment of the light source of FIG. 1.

FIG. 2 shows an alternative embodiment for the source of light 50 of FIG. 1. This embodiment comprises a cathode ray tube 100 having a laterally elongate screen 104 which would be aligned with the photo-optical sensor 54 (FIG. 1). The control unit 44 would be coupled to the cathode ray tube 100 to cause it to produce a beam of electrons 108, movable back and forth by deflection plates 112 to develop a sweeping light spot 116 on the screen 104. Both the intensity and the size of the light spot 116 can be varied in a conventional fashion, with the size being controlled by a focusing electrode 120. A desired spot size would be selected by appropriate manual settings of control knobs 46 of control unit 44 (FIG. 1), in a manner similar to manual adjustment of contrast, brightness, etc. of a conventional television. Controlling the size of the spot 116 enables control of the degree of enhancement of detail of the image, i.e. sharpness of the edges of an object, lines of contrast separation, etc. The smaller the spot, the sharper is the detail—in a manner similar to use of smaller but more pixels to improve detail in a picture. If the spot is made smaller, more sweeps would be needed for the film being processed in order to completely cover the film. The sweep speed of the beam can be controlled by controlling the amount of voltage applied to the deflection plates 112, again in a conventional manner.

To further reduce light scattering and dispersion, a fiber optic "lens" could be positioned between the cathode ray tube 100 and the film 4 (FIG. 2) to focus the light more precisely on the film.

Figure 3:
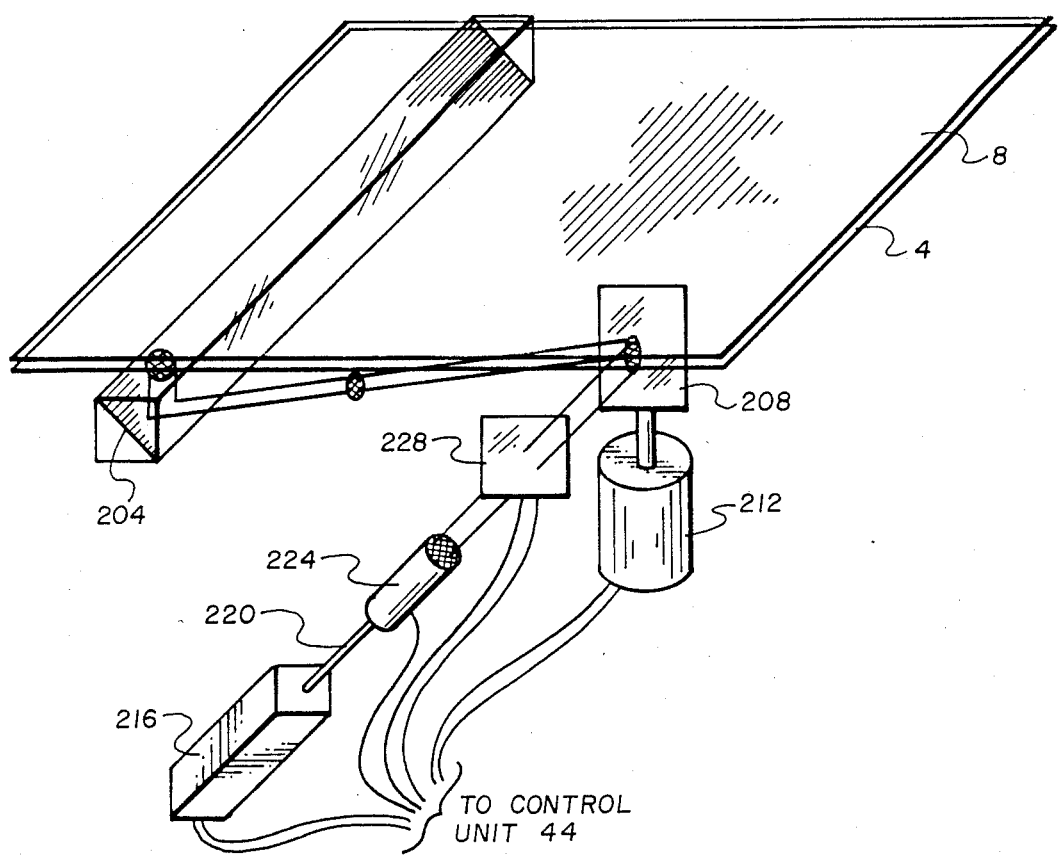
FIG. 3 is a perspective view of another alternative embodiment of the light source of FIG. 1.

FIG. 3 shows still another embodiment of a light source for the present invention. This embodiment includes an elongate light reflector 204 which would be aligned with the sensor 54 of FIG. 1. A rotatable light reflector 208, whose rotation (about a vertical axis) is controlled by a galvanometer 212, is positioned under the films 4 and 8. A laser 216 is stimulated to direct a laser beam 220 through an adjustable beam expander 224 (which operates under control of the control unit 44 of FIG. 1) and an electro-optical light modulator 228 (also controlled by the control unit) to the light reflector 208. The beam expander 224 controls the size (width) of the laser beam (for the reasons discussed earlier), and the modulator 228 controls the intensity. The laser beam reaching the reflector 208 is reflected toward the reflector 204 and ultimately up toward the films 4 and 8. The reflector 208 is caused to rotate to thus reflect the laser beam to sweep back and forth along the reflector 204 and back and forth on the film 4 at a speed determined (and controllable) by the galvanometer. The modulator 228 might illustratively be an acoustic-optical modulator and the expander 224 might illustratively be a conventional beam expanding optical system such as used in holography.

Figure 4:
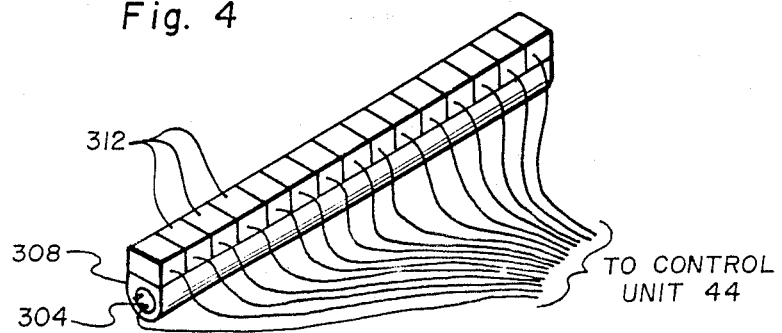
FIG. 4 is a perspective view of still another alternative embodiment of the light source of FIG. 1.

FIG. 4 shows an embodiment of the light source 50 of FIG. 1 which includes a conventional elongate lamp 304 positioned in an elongate reflector 308 to direct light upwardly toward an array of liquid crystal diodes 312. The control unit 44 successively pulses the normally opaque diodes to momentarily make them transparent so that they can pass light from the lamp 304 to the original film 4 (FIG. 1). In this manner a beam of light is successively directed at the film as each diode in the line is made transparent to pass light, so that the beam scans from one side of the film to the other side as desired. The intensity of the light passing through the diodes is determined by the magnitude of the pulses supplied by the control unit 44, i.e., the larger the magnitude of the pulses, the more transparent are the diodes; likewise, the speed of scanning is determined by the rate at which the pulses are supplied to the diodes.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Apparatus for optically processing developed films comprising
   means for holding a developed film and an unexposed film generally parallel, one above the other, and in close proximity to one another,
   a light source positioned on one side of said film holding means, in close proximity to a developed film held in the holding means, for directing a beam of light toward the developed film to scan generally in a line across the film, the intensity of the light being variable in response to a light control signal supplied to the light source,
   an array of sensors positioned on the other side of said film holding means, in close proximity to an unexposed film held in the holding means, and aligned with the line of travel of the light beam, each adapted to sense and signal the intensity of light impinging thereon,
   control means responsive to signals from the sensors for developing and applying to the light source light control signals for varying the intensity of the light beam, and
   means for moving the film holding means relative to the light source in a direction transversely of the line of travel of the light beam so that the developed film is scanned by the light substantially over its length and width.

2. Apparatus as in claim 1, wherein said control means is adapted to signal the light source to increase the intensity of the light beam when the intensity of light detected by the sensors decreases, and vice versa.

3. Apparatus as in claim 1, further including means coupled to the light source for selectively varying the light beam width.

4. Apparatus as in claim 1, wherein said light source comprises a generally linear array of light-emitting elements positioned adjacent the developed film and arranged in alignment with the array of sensors, with the elements being responsive to light control signals for sequentially producing a beam of light directed toward the developed film.

5. Apparatus as in claim 1, wherein said light source comprises a cathode ray tube having a laterally elongate screen positioned adjacent the developed film and aligned with the array of sensors, said cathode ray tube being responsive to light control signals for producing an electron beam which repetitively sweeps across the screen.

6. Apparatus as in claim 1, wherein said light source comprises
   an elongate light reflector means positioned adjacent the developed film and aligned with the array of sensors for redirecting a received beam of light toward the developed film,
   a movable reflector which directs a received beam of light to repetitively sweep back and forth along the elongate reflector,
   beam producing means for producing and directing a beam of light toward the movable reflector, and
   light modulator means disposed between the beam producing means and movable reflector and responsive to the light control signals for varying the amount of light traveling therethrough to the movable reflector.

7. Apparatus as in claim 1, wherein said light source comprises an elongate lamp aligned with the array of sensors to direct light toward the developed film, and shutter means disposed between the lamp and the film holding means, adjacent to the developed film, for sequentially exposing portions of the lamp along the length thereof to the developed film.

8. Apparatus as in claim 4, wherein said control means includes means for supplying light control signal pulses of variable magnitude sequentially to the light-emitting elements, and wherein the light-emitting elements comprise elements for emitting light having an intensity proportional to the magnitude of received light control signal pulses.

9. Apparatus as in claim 5, wherein said control means includes means for supplying light control signals having a variable parameter, and wherein the cathode ray tube is adapted to produce a raster scan whose intensity varies with variation in the parameter of the light control signals.

10. Apparatus as in claim 6, wherein said light producing means comprises a laser.

11. Apparatus as in claim 6 wherein said light source further comprises a light beam expander means positioned in the light beam path for selectively varying the width of the light beam.

12. Apparatus as in claim 7, wherein said shutter means comprises a generally linear array of normally opaque liquid crystal diodes, each responsive to the light control signals for sequentially becoming momentarily transparent, to allow light from the lamp to pass therethrough to the developed film.

13. Apparatus for producing an enhanced radiographic image from a developed radiograph comprising means for supporting the radiograph in a generally parallel, stacked relationship with a radiographic film, light producing means disposed on one side of the supporting means in close proximity to the developed radiograph to direct a beam of light at the radiograph when the radiograph and film are in place in the supporting means, means for causing light from the light producing means to repetitively move across the radiograph generally in a line from one side to the other at a scanning speed determined by received control signals, elongate sensor means disposed on the other side of the supporting means and aligned with the line of travel of the light to receive light passing through the radiograph and film from the light producing means, and thereby produce signals indicating the intensity of the received light, control means responsive to signals from the sensor means for producing control signals for causing the light moving means to increase the scanning speed as the intensity of light received by the sensor means increases and vice-versa, and means for causing relative movement between the supporting means and the light producing means and sensor means so that the radiograph and film are scanned by the light substantially over their length and width.

14. Apparatus as in claim 13, further including means for moving the supporting means relative to the light producing means and sensor means at a speed proportional to the intensity of light received by the sensor means.

15. Apparatus as in claim 14 further including means for selectively varying the width of the beam of light supplied to the radiograph.

16. A method of producing an enhanced radiographic image comprising (a) placing a developed radiograph, whose image is to be enhanced, in a generally parallel, stacked relationship with an unexposed radiographic film, (b) directing a beam of light at the radiograph to scan generally in a line across the radiograph, (c) detecting the intensity of light passing through the radiograph and film, (d) varying the intensity of the light beam as the intensity of the detected light varies, and (e) causing relative movement, in a direction transverse to the line of travel of the light beam, between the stacked radiograph and film on the one hand, and the beam of light on the other hand, so that the radiograph is scanned with light substantially over its length and width and the film is exposed.

17. The method of claim 16, wherein step (d) comprises reducing the intensity of the light beam as the intensity of the detected light increases, and vice-versa.

18. The method of claim 17 further including the step of adjusting the width of the beam light, prior to step (b), to a desired level.

19. The method of either claims 16 or 17 further including the step of varying the speed of relative movement between the radiograph and film, and the light beam, as the intensity of the detected light varies.

20. A method of producing an enhanced radiographic image comprising (a) placing a developed radiograph, whose image is to be enhanced, in a generally parallel, stacked relationship with an unexposed radiographic film, (b) directing a beam of light at the radiograph to scan generally in a line across the radiograph, (c) detecting the intensity of light passing through the radiograph and film, (d) varying the light beam scanning speed as the intensity of the detected light varies, and (e) causing relative movement, in a direction transverse to the line of travel of the light beam, between the stacked radiograph and film on the one hand, and the beam of light on the other hand, so that the radiograph is scanned with light substantially over its length and width and the film is exposed.

21. The method of claim 20, wherein the step (d) comprises reducing the light beam scanning speed as the intensity of the detected light decreases, and vice versa.

22. The method of claim 21 further including the step of varying the width of the beam of light, prior to step (b), to a selected value.

* * * * *